March 8, 1949.  G. E. CUTTAT  2,463,521
CLUTCH OPERATOR FOR LATHES
Filed Dec. 28, 1946
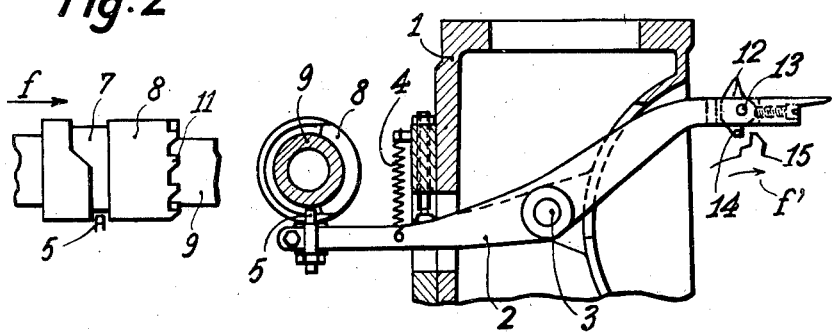
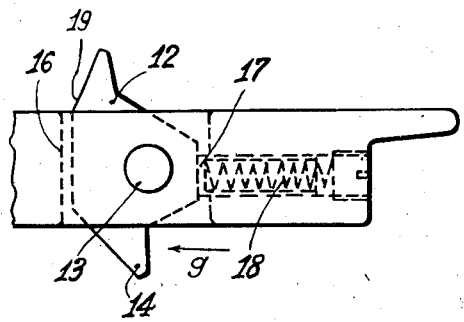
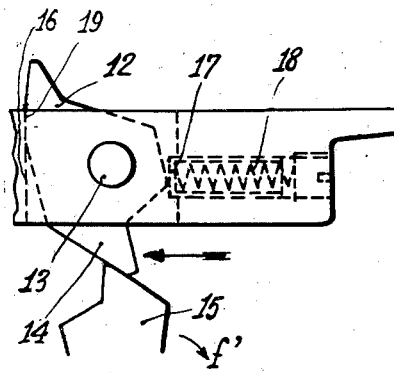
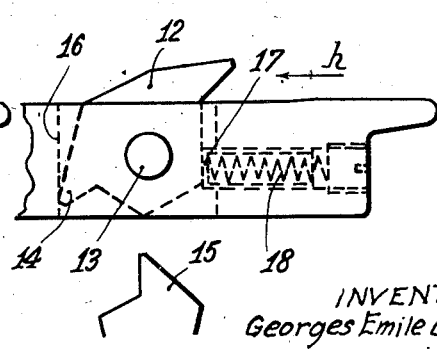
INVENTOR
Georges Emile Cuttat
By Robert E. Burns
ATTORNEY Patented Mar. 8, 1949

2,463,521

UNITED STATES PATENT OFFICE 2,463,521

CLUTCH OPERATOR FOR LATHES

Georges Emile Cuttat, Geneva, Switzerland, assignor to Manufacture de Machines du Haut-Rhin, Haut-Rhin, France, a company of France Application December 28, 1946, Serial No. 719,089
In France February 1, 1944

Section 1, Public Law 690, August 8, 1946
Patent expires February 1, 1964

1 Claim. (Cl. 192—93)

In automatic one spindled lathes with an auxiliary shaft, there exists, on the auxiliary shaft a number of clutches which, when unlocked at determined times during the operation cycle, by the main driving shaft, automatically determine, under the action of the rotation of the auxiliary shaft, various operations of lathe work.

The clutches in question, therefore, are normally locked, through a lever whose other end is provided with an extension or finger capable of being met and raised by a cam of the main shaft. However, in some cases and particularly when adjusting the machine, it would be troublesome to have the rotation of the main driving shaft start the successive operations of the work cycle.

For this purpose, therefore, extensions or fingers have been used, capable of disappearing at will, in such a manner that when in their effaced position they are no longer met by the cams of the main driving shaft.

According to the present invention a hooked finger mounted on the lever and giving perfect reliability of operation without causing any mechanical complication is used. This polygonal shaped hooked finger is capable of assuming several different positions about an axis and, according to the position assumed, it can either be engaged by the cam of the main shaft or cause the operation of the unlocking organ or of effacing itself so that the unlocking organ is not influenced by the cam of the main shaft.

Preferably, at least one thrust block will ensure the rigidity of this hooked finger in the working position while a spring acting on the hooked finger in the direction of its pivoting axis anchors this hooked finger in various positions, while allowing rotation when the resistance of said spring is overcome.

One type of embodiment of the device incorporating the object of the present invention will be described herein and represented, by way of example, in the appended drawing in which:

Figure 1 is a view of the entire device, in cross section with respect to the main cam shaft and the auxiliary shaft;

Figure 2 is a partial elevation of the auxiliary shaft viewed perpendicularly to the plane of Figure 1; and Figures 3, 4, 5 show, in elevation, on an enlarged scale the detail of the positions of the hooked finger, at rest, in the working, and in the effaced positions.

In frame 1 is mounted a two-armed control lever 2, pivoted at 3 and subjected to the action of a spring 4. At one of its ends, this lever has a stop peg 5 capable of entering groove 7, of an appropriate shape, in sheath 8, sliding without turning on auxiliary shaft 9 and provided with clutch teeth 11, cooperating with corresponding clutch teeth (not shown) of an organ which is thus rotatably associated with the auxiliary shaft. An elastic device, not shown, tends to push back the sheath in the direction shown by arrow $f$, towards the "in gear" position.

The other end of lever 2 carries a polygonal shaped hooked finger 12, capable of turning about axis 13. The hooked finger proper 14 is capable of being engaged by cam 15 fixed on the main cam shaft (not shown), turning in the direction of arrow $f'$.

Hooked finger 12 is placed inside a housing of the end of lever 2 and one of the walls 16 of this housing acts as a thrust block while on the other side of hooked finger 12 a piston 17, acted upon by a spring 18 acts.

Figure 3 shows the rest position of hooked finger 12. This position is ensured by the action of spring piston 17, 18, acting on one of the polygonal faces of the hooked finger.

Figure 4 shows the working position; cam 15, acting on hooked finger 14, has rotated hooked finger 12 until face 19 of the polygon thrusts against side wall 16 of the housing. At this instant, cam 15, continuing its rotation, triggers, by means of hook 14, lever 2, which causes peg 5 to come out of groove 7 and thus releases clutch sheath 8. The "in gear" operation occurs and auxiliary shaft 9 determines the required operation.

As soon as hook finger 14 has escaped cam 15, hooked finger 12 comes back to the rest position of Figure 3. At the same time, peg 5, under the action of spring 4 falls back into the flared part of groove 7. The rotation of the auxiliary shaft causes the inclined curved surface on the edge of this groove to act on peg 5 and sheath 8 is brought back towards the left (Figure 2), effecting the putting out of gear. Hooked finger 12 is in position for further operation in case several cams 15 have been arranged along the periphery of the main shaft. Operation is accurate even if the cams are very close to one another, since the escape faces of hooked finger 12 are arranged along the radii issuing from the center of pivot 13 and the cessation of contact is immediate.

Figure 5 shows the effaced position. Passage from the rest position (Figure 3) to the effaced position is effected by means of a tool, acting on hook 14 in the direction of arrow $g$ (Figure 3).

The shape of polygonal hooked finger 12 has been determined, graphically, in such a way that hook 14 then thrusts against wall 16 of the housing, and is held in this position by spring loaded piston 17, 18, acting on another face of hooked finger 12. Under such conditions, the passing of cams 15 under lever 2 will have no effect on this lever and, consequently on clutch sheath 8. A simple action, from right to left (arrow h), by means of a screwdriver, for instance, on the portion of hooked finger 12 protruding over lever 8 allows the compression of spring 18 and the return to the rest position shown in Figure 3, in which hook 14 will be engaged anew by cams 15.

What I claim is:

In a control device for a lathe, a main driving shaft, a cam on said main driving shaft, an auxiliary shaft, a clutch on said auxiliary shaft, a lever having two arms, said lever being pivoted on a fixed axis, a member carried by one arm of said lever and cooperating with said clutch, elastic means for urging said lever into locking position of said clutch, a polygonal hooked finger rotatively mounted on the other arm of said lever, a thrust block on the lever against which one of the polygonal faces of said hooked finger bears when its hook is engaged by the cam of the driving shaft, elastic means mounted in the lever on the opposite side of the polygonal finger from the thrust block and acting on the polygonal finger in a direction towards and substantially perpendicularly to the bearing face of the thrust block and in such direction with relation to the axis of rotation of the polygonal finger as to give to said finger an equilibrium position in which no face of the polygon bears on the thrust block, and to allow, when the resistance of the elastic means is overcome by a rotation of the polygonal finger in the direction opposite to that given by the cam, the polygonal finger to take a position in which the hook of said finger is not engaged by the cam.

GEORGES EMILE CUTTAT.

REFERENCES CITED

The following references are of record in the file of this patent:

UNITED STATES PATENTS

| Number | Name | Date |
|---|---|---|
| 806,916 | Rich | Dec. 12, 1905 |
| 1,757,626 | Grotnes | May 6, 1930 |